(12) United States Patent
Jain et al.

(10) Patent No.: US 8,787,180 B2
(45) Date of Patent: *Jul. 22, 2014

(54) SYSTEM AND METHOD FOR RATE ASSIGNMENT

(75) Inventors: Avinash Jain, San Diego, CA (US); Jelena Damnjanovic, Del Mar, CA (US); Tao Chen, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/340,009

(22) Filed: Dec. 19, 2008

(65) Prior Publication Data

US 2009/0097412 A1    Apr. 16, 2009

Related U.S. Application Data

(62) Division of application No. 10/640,777, filed on Aug. 13, 2003, now Pat. No. 7,630,321.

(60) Provisional application No. 60/409,820, filed on Sep. 10, 2002.

(51) Int. Cl.
| | |
|---|---|
| *H04W 28/22* | (2009.01) |
| *H04W 4/00* | (2009.01) |
| *H04W 52/00* | (2009.01) |
| *H04W 88/02* | (2009.01) |
| *H04B 7/26* | (2006.01) |
| *H04L 12/26* | (2006.01) |

(52) U.S. Cl.
USPC .......... 370/252; 370/332; 455/67.11; 455/522

(58) Field of Classification Search
USPC .................. 370/252, 332; 455/67.11, 522
See application file for complete search history.

(56) References Cited

U.S. PATENT DOCUMENTS

| | | |
|---|---|---|
| 4,763,322 A | 8/1988 | Eizenhofer |
| 5,224,120 A | 6/1993 | Schilling |
| 5,289,463 A | 2/1994 | Mobasser |
| 5,367,523 A | 11/1994 | Chang et al. |
| 5,390,165 A | 2/1995 | Tuch |
| 5,442,625 A | 8/1995 | Gitlin et al. |

(Continued)

FOREIGN PATENT DOCUMENTS

| | | |
|---|---|---|
| EP | 0719062 A2 | 6/1996 |
| EP | 0782364 A2 | 7/1997 |

(Continued)

OTHER PUBLICATIONS

Prasad, R. et al.: "Third Generation Mobile Communication Systems," Jan. 1, 2000, pp. 243-248.

(Continued)

*Primary Examiner* — Alpus H Hsu
(74) *Attorney, Agent, or Firm* — Michelle S. Gallardo (57) ABSTRACT

A method and apparatus for determining the data rate of a reverse link communication. An embodiment includes transmitting at a null rate on the communication channel only when the station is not transmitting voice, signaling, or data. An embodiment includes determining a maximum requested rate based on the normalized average pilot transmit power and the pilot reference value, and determining the timing of the rate request. An embodiment involves determining a maximum transmission rate. An embodiment involves determining sufficient power and a power-control set point.

12 Claims, 6 Drawing Sheets

(56) References Cited

U.S. PATENT DOCUMENTS

| | | | |
|---|---|---|---|
| 5,465,389 A | 11/1995 | Agrawal et al. | |
| 5,490,136 A | 2/1996 | Sereno et al. | |
| 5,490,165 A | 2/1996 | Blakeney, II et al. | |
| 5,537,410 A | 7/1996 | Li | |
| 5,619,492 A | 4/1997 | Press et al. | |
| 5,640,414 A | 6/1997 | Blakeney, II et al. | |
| 5,648,955 A | 7/1997 | Jensen et al. | |
| 5,649,000 A | 7/1997 | Lee et al. | |
| 5,729,534 A | 3/1998 | Jokinen et al. | |
| 5,734,646 A | 3/1998 | I et al. | |
| 5,784,358 A | 7/1998 | Smith et al. | |
| 5,784,695 A | 7/1998 | Upton et al. | |
| 5,839,056 A | 11/1998 | Hakkinen | |
| 5,914,950 A | 6/1999 | Tiedemann, Jr. et al. | |
| 5,923,650 A | 7/1999 | Chen et al. | |
| 6,018,515 A | 1/2000 | Sorber | |
| 6,064,678 A | 5/2000 | Sindhushayana et al. | |
| 6,088,324 A | 7/2000 | Sato et al. | |
| 6,167,270 A | 12/2000 | Rezaiifar et al. | |
| 6,173,187 B1 | 1/2001 | Salonaho et al. | |
| 6,173,197 B1 | 1/2001 | Boggett et al. | |
| 6,205,129 B1* | 3/2001 | Esteves et al. | 370/331 |
| 6,317,234 B1 | 11/2001 | Quayle | |
| 6,335,922 B1 | 1/2002 | Tiedemann, Jr. et al. | |
| 6,335,923 B2 | 1/2002 | Kubo et al. | |
| 6,337,983 B1 | 1/2002 | Bonta et al. | |
| 6,366,761 B1 | 4/2002 | Montpetit | |
| 6,396,804 B2* | 5/2002 | Odenwalder | 370/209 |
| 6,400,699 B1 | 6/2002 | Airy et al. | |
| 6,418,320 B2 | 7/2002 | Yoshida et al. | |
| 6,473,624 B1 | 10/2002 | Corbett et al. | |
| 6,549,525 B2* | 4/2003 | Odenwalder | 370/332 |
| 6,560,211 B2* | 5/2003 | Esteves et al. | 370/331 |
| 6,563,810 B1* | 5/2003 | Corazza | 370/335 |
| 6,594,241 B1 | 7/2003 | Malmlof | |
| 6,597,705 B1 | 7/2003 | Rezaiifar et al. | |
| 6,633,552 B1* | 10/2003 | Ling et al. | 370/318 |
| 6,633,554 B1 | 10/2003 | Dalal | |
| 6,728,233 B1 | 4/2004 | Park et al. | |
| 6,741,562 B1 | 5/2004 | Keirouz et al. | |
| 6,782,271 B2 | 8/2004 | Huh et al. | |
| 6,798,736 B1* | 9/2004 | Black et al. | 370/208 |
| 6,804,219 B2 | 10/2004 | Koo et al. | |
| 6,807,426 B2 | 10/2004 | Pankaj | |
| 6,816,476 B2 | 11/2004 | Kim et al. | |
| 6,842,624 B2 | 1/2005 | Sarkar et al. | |
| 6,963,746 B2 | 11/2005 | Sato et al. | |
| 6,967,998 B1* | 11/2005 | Chen et al. | 375/224 |
| 7,002,899 B2* | 2/2006 | Azenkot et al. | 370/208 |
| 7,010,316 B2 | 3/2006 | Chen | |
| 7,031,741 B2 | 4/2006 | Lee et al. | |
| 7,042,858 B1 | 5/2006 | Ma et al. | |
| 7,065,060 B2 | 6/2006 | Yun et al. | |
| 7,079,522 B1 | 7/2006 | Kim et al. | |
| 7,085,239 B2 | 8/2006 | Ling et al. | |
| 7,088,957 B2* | 8/2006 | Ling et al. | 455/67.11 |
| 7,133,460 B2* | 11/2006 | Bae et al. | 375/295 |
| 7,171,214 B2 | 1/2007 | Shively et al. | |
| 7,200,127 B1 | 4/2007 | Lee et al. | |
| 7,206,296 B2 | 4/2007 | Miyoshi et al. | |
| 7,215,653 B2* | 5/2007 | Kim et al. | 370/329 |
| 7,236,467 B2 | 6/2007 | Kono | |
| 7,245,600 B2 | 7/2007 | Chen | |
| 7,289,473 B1 | 10/2007 | Padovani et al. | |
| 7,339,894 B2* | 3/2008 | Corazza | 370/236 |
| 7,411,923 B2* | 8/2008 | Attar et al. | 370/328 |
| 7,411,974 B2* | 8/2008 | Attar et al. | 370/465 |
| 7,486,961 B2 | 2/2009 | Lee et al. | |
| 7,580,346 B2* | 8/2009 | Azenkot et al. | 370/208 |
| 7,626,989 B2 | 12/2009 | Raitola et al. | |
| 7,630,321 B2 | 12/2009 | Jain et al. | |
| 7,680,052 B2* | 3/2010 | Corazza | 370/236 |
| 7,835,695 B2* | 11/2010 | Ling et al. | 455/39 |
| 2002/0136186 A1 | 9/2002 | Watanabe | |
| 2002/0147025 A1 | 10/2002 | Savas | |
| 2002/0160782 A1 | 10/2002 | Joshi et al. | |
| 2003/0125040 A1 | 7/2003 | Walton et al. | |
| 2003/0142732 A1 | 7/2003 | Moshavi et al. | |
| 2004/0037565 A1 | 2/2004 | Young et al. | |
| 2004/0052212 A1 | 3/2004 | Baillargeon | |
| 2004/0185868 A1 | 9/2004 | Jain et al. | |
| 2005/0004970 A1 | 1/2005 | Jain et al. | |
| 2005/0014474 A1* | 1/2005 | Jitsukawa et al. | 455/101 |
| 2005/0107106 A1 | 5/2005 | Valkealahti et al. | |
| 2005/0147063 A1 | 7/2005 | Pi et al. | |
| 2009/0170523 A1 | 7/2009 | Jain et al. | |

FOREIGN PATENT DOCUMENTS

| | | |
|---|---|---|
| EP | 1067704 | 10/2001 |
| JP | H08149551 A | 4/1996 |
| JP | 2001516975 | 10/2001 |
| KR | 20010102373 | 11/2001 |
| KR | 20020083942 | 11/2002 |
| RU | 2233045 | 7/2004 |
| TW | 318983 | 11/1997 |
| TW | 453056 | 9/2001 |
| WO | WO9401975 A1 | 1/1994 |
| WO | WO9507578 A1 | 3/1995 |
| WO | WO9524102 A2 | 9/1995 |
| WO | WO9610305 | 4/1996 |
| WO | WO9610320 | 4/1996 |
| WO | WO9637081 A1 | 11/1996 |
| WO | WO9909779 A1 | 2/1999 |
| WO | WO0025485 A1 | 5/2000 |
| WO | 0048336 | 8/2000 |
| WO | WO0048669 A1 | 8/2000 |
| WO | 0074289 | 12/2000 |
| WO | WO0131824 A1 | 5/2001 |
| WO | WO0143485 A1 | 6/2001 |
| WO | 02065664 | 8/2002 |

OTHER PUBLICATIONS

Physical Layer Standard for cdma2000 spread spectrum systems release c May 28, 2002 pp. 2-189-2-199.
Alan Gatherer, Edgar Auslander: "The Application of Programmable DSPs in Mobile Communications" [Online] Apr. 18, 2002, Wiley, England.
Attar R A et al: "A reverse link outer-loop power control algorithm for cdma2000 1xEV systems" ICC 2002. 2002 IEEE International Confernce on Communications, NY, vol. 1, Apr. 28, 2002.
Ramjee Prasad, Werner Mohr, Wlater Konhauser: "Third Generation Mobile Communication Systems", Jan. 1, 2000, pp. 245, 247.
Telecommunication Industry Association: "Physical Layer Standard for CDMA2000 Spread Spectrum Systems", May 1, 2002.
International Search Report—PCT/US03/028670—International Search Authority, European Patent Office—Feb. 6, 2004.
International Preliminary Examination Report—PCT/US03/028670—IPEA—US—Apr. 29, 2005.
Written Opinion—PCT/US03/028670—IPEA—US—Aug. 19, 2004.
Tero Ojanpera, Ramjee Prasad (Interpreter: Xuhong Zhu etc.): "Wideband CDMA for Third Generation Mobile Communications" Jun. 2000, People Posts & Telecommunications Publishing House, Bejing, pp. 170-209 and 275-285.
International Search Report—PCT/US03/028671—International Search Authority, European Patent Office—Sep. 21, 2004.
Avinash Jain: "Reverse Link System Stimulation Results for IS-2000 Release A Using DVRL Evaluation Framework", 3GPP2, Dec. 3, 2001 pp. 1-11 XP002526313.
Avinash Jain: "IS-2000 Release C Simulation Configuration Specification, Rev. 7" 3GPP2, Dec. 9, 2002, pp. 1-19.
Avinash Jain: "IS-2000 Release 0 Simulation Configuration Specification, Rev. 2" 3GPP2, Sep. 9, 2002, pp. 1-16.
"Upper Layer (layer3) Signaling standard for cdma2000 spread spectrum systems" TIA/EIA Interim Standard IS-2000.5-A-2. Feb. 2004.
Avinash Jain: "A time-scalable priority-based scheduler for IS-2000 Release C reverse link baseline simulations," 3GPP2, 3GPP2-TSG-C30-20030113-xxx, Jan. 13, 2002, pp. 1-9.

(56) References Cited

OTHER PUBLICATIONS

Damnjanovic et al., "Scheduling the cdma2000 Reverse Link", IEEE 56th Vehicular Technology Conference Proceedings, Vancouver, Canada, Sep. 24-27, 2002, vol. 1, pp. 386-390 XP010608583.

TIA/EIA/IS-95-B Mobile Station-Base Station Compatibility Standard for Dual-Mode WideBand Spread Spectrum Cellular System (IS-95 Standard), Feb. 3, 1999.

Chen T., "Proposed Text to Clarify the Usage of Multiple_Channel_Adjustment_Gain", 3GPP2 TSG-C meeting document, May 14, 2002, 3GPP2-C30-20020513-020, URL, ftp://ftp.3gpp2.org/TSGC/Working/2002/TSG-C-0205/TSG-C-2002-05/WG3/C30-20020513-020 QC_MultipleChannelAdjustmentGainClarification.doc.

Jain A., "IS-2000 Release C Simulation Configuration Specification, Rev.11", 3GPP2 TSG-C meeting document, Apr. 14, 2003,C30-20030414-064,URL,http://ftp.3gpp2.org/TSGC/working/2003/2003-04-Coeur-d%27Alene/ TSG-C-2003-04-Coeur-d%27Alene/WG3/C30-20030414-064R1_1x-RelC-Sim-Specification_Rev11.doc.

\* cited by examiner

(PRIOR ART)

FIG. 1

SET POINT ADJUSTMENT DUE TO RATE
TRANSITIONS ON R-SCH

FIG. 2

SCHEDULING DELAY TIMING

FIG. 3

PARAMETERS ASSOCIATED IN MOBILE
STATION SCHEDULING ON RL

SYSTEM AND METHOD FOR RATE ASSIGNMENT

CLAIM OF PRIORITY UNDER 35 U.S.C. §120

The present application for patent is a divisional of patent application Ser. No. 10/640,777 entitled "SYSTEM AND METHOD FOR RATE ASSIGNMENT" allowed Oct. 9, 2008, which claims priority to Provisional Application No. 60/409,820, filed Sep. 10, 2002, assigned to the assignee hereof and hereby expressly incorporated by reference herein.

BACKGROUND

1. Reference to Co-Pending Applications for Patent

The present invention is related to the following applications for patent in the U.S. Patent & Trademark Office:

"System and Method for Multilevel Scheduling" by Avinash Jain, having Ser. No. 10/640,720, filed concurrently herewith and assigned to the assignee hereof, and which is expressly incorporated by reference herein.

2. Field

The present disclosed embodiments relate generally to wireless communications, and more specifically to reverse link rate scheduling in a communication system having a variable data transmission rate.

3. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems designed to allow multiple users to access a common communications medium have been developed for such cellular systems. These modern communication systems may be based on code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems.

In FDMA systems, the total frequency spectrum is divided into a number of smaller sub-bands and each user is given its own sub-band to access the communication medium. Alternatively, in TDMA systems, each user is given the entire frequency spectrum during periodically recurring time slots. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named CDMA communication systems and standards, the available spectrum is shared simultaneously among a number of users, and techniques such as soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from a mobile station, very fast scheduling, and scheduling for services that have more relaxed delay requirements. An example of such a data-only communication system using these techniques, is the high data rate (HDR) system that conforms to the TIA/EIA/IS-856 standard (the IS-856 standard).

In contrast to the other above named standards, an IS-856 system uses the entire spectrum available in each cell to transmit data to a single user at one time. One factor used in determining which user is served is link quality. By using link quality as a factor for selecting which user is served, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1x-EVDV", submitted to 3GPP2 as document number C50-20010820-012, Aug. 20, 2001. These are hereinafter referred to as the 1xEV-DV proposal.

Scheduling utilizing techniques involving requested rate, maximum transmission rate, and power control may be useful for more efficient capacity utilization on the reverse link.

SUMMARY

Embodiments disclosed herein address the above stated needs by providing a method and system for rate assignment in a communication system.

In an aspect, a method of transmitting on a communication channel from a station, comprises transmitting voice on the communication channel, transmitting signaling and data on the communication channel, and communication channel only when the station is not transmitting voice, signaling, or data.

In an aspect, a method of determining a maximum requested rate, comprises determining a normalized average pilot transmit power, and determining a maximum requested rate based on the normalized average pilot transmit power and the pilot reference value.

In another aspect, a method of determining whether a station has sufficient power to transmit on a communication channel, comprises determining a power value, wherein the power value is based on the product of a pilot reference level value, a normalized average pilot transmit power, and a factor, wherein the factor is based on a traffic-to-pilot ratio, a control-to-pilot ratio, and a pilot reference value ratio of the communication channel, and determining whether the power value is less than a ratio of maximum transmission power over a headroom value.

In another aspect, a method of determining a power-control set point, comprises determining the pilot reference level of the current data rate, determining the pilot reference level of the next data rate, determining the difference between the pilot reference level of the current data rate and the pilot reference level of the next data rate, and adjusting the power-control set point based on the difference if the next data rate is greater than the old data rate.

In yet another aspect, a method of determining timing of a rate request, comprises transmitting a rate request if data arrives in a buffer, data in the buffer exceeds a buffer depth, and sufficient power exists to transmit at a non-zero rate, transmitting a rate request if a last rate request was sent at time $\tau_i$, the current time is greater than or equal to $\tau_i$+SCH_PRD, wherein SCH_PRD is a scheduled duration period, data in a buffer exceeds a buffer depth, and sufficient power exists to transmit at a non-zero rate, and transmitting a rate request if the last rate request was sent at time $\tau_i$, the current time is greater than or equal to $\tau_i$+SCH_PRD, and a current assigned rate is non-zero.

In an aspect, a method of updating a queue estimate in a scheduler, comprises receiving a rate request message, updating the queue estimate to a queue size reported in the rate request message, decoding a fundamental channel frame and decoding a supplemental channel frame, and updating the queue estimate based on data in the decoded fundamental channel frame and the decoded supplemental channel frame.

In another aspect, a method of determining a maximum transmission rate, comprises determining Rmax(power), the maximum transmission rate reported in a rate request message, determining a maximum supportable transmission rate based on a queue estimate, and selecting the minimum of the Rmax(power) and the maximum supportable transmission rate.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
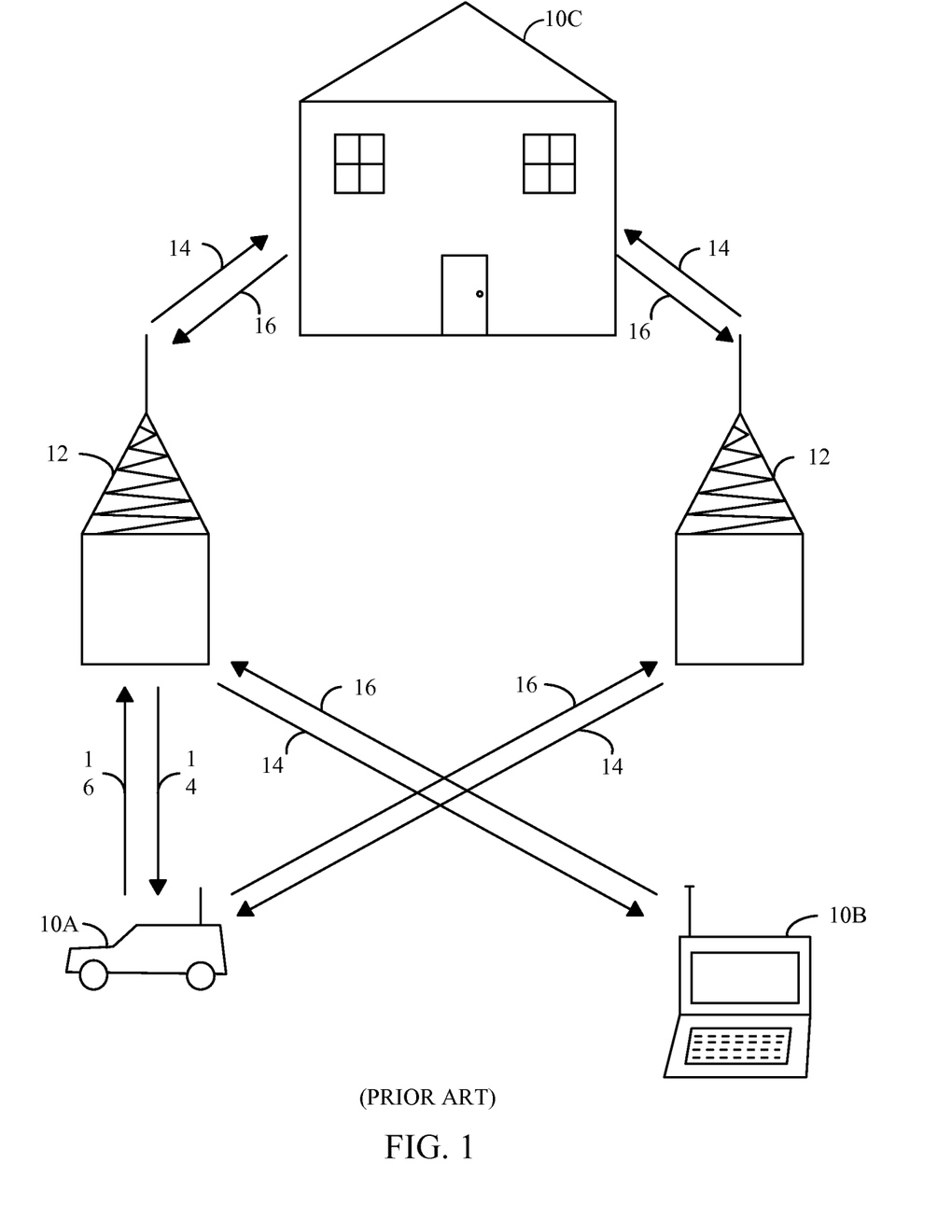
FIG. 1 exemplifies an embodiment of a wireless communication system with three mobile stations and two base stations.

A wireless communication system may comprise multiple mobile stations and multiple base stations. FIG. 1 exemplifies an embodiment of a wireless communication system with three mobile stations 10A, 10B and 10C and two base stations 12. In FIG. 1, the three mobile stations are shown as a mobile telephone unit installed in a car 10A, a portable computer remote 10B, and a fixed location unit 10C such as might be found in a wireless local loop or meter reading system. Mobile stations may be any type of communication unit such as, for example, hand-held personal communication system units, portable data units such as a personal data assistant, or fixed location data units such as meter reading equipment. FIG. 1 shows a forward link 14 from the base station 12 to the mobile stations 10 and a reverse link 16 from the mobile stations 10 to the base stations 12.

As a mobile station moves through the physical environment, the number of signal paths and the strength of the signals on these paths vary constantly, both as received at the mobile station and as received at the base station. Therefore, a receiver in an embodiment uses a special processing element called a searcher element, that continually scans the channel in the time domain to determine the existence, time offset, and the signal strength of signals in the multiple path environment. A searcher element is also called a search engine. The output of the searcher element provides the information for ensuring that demodulation elements are tracking the most advantageous paths.

A method and system for assigning demodulation elements to a set of available signals for both mobile stations and base stations is disclosed in U.S. Pat. No. 5,490,165 entitled "DEMODULATION ELEMENT ASSIGNMENT IN A SYSTEM CAPABLE OF RECEIVING MULTIPLE SIGNALS," issued Feb. 6, 1996, and assigned to the Assignee of the present.

When multiple mobiles transmit simultaneously, the radio transmission from one mobile acts as interference to the other mobile's radio transmission, thereby limiting throughput achievable on the reverse link (also called the uplink). For efficient capacity utilization on the reverse link, centralized scheduling at the base station has been recommended in U.S. Pat. No. 5,914,950 entitled "METHOD AND APPARATUS FOR REVERSE LINK RATE SCHEDULING," issued Jun. 22, 1999, and U.S. Pat. No. 5,923,650 entitled "METHOD AND APPARATUS FOR REVERSE LINK RATE SCHEDULING," issued Jul. 13, 1999, both of which are assigned to the Assignee of the present.

In an exemplary embodiment, multi-level scheduling is performed. In an embodiment, multi-level scheduling comprises base station level scheduling, selector level scheduling, and/or network level scheduling.

In an embodiment, a detailed design of a flexible scheduling algorithm is based on fundamental theoretical principles that limit reverse-link system capacity, while using existing network parameters available or measured by a base station.

In an embodiment, base-station estimation of each mobile's capacity contribution is based on measured signal-to-noise ratio (Snr) or pilot energy over noise plus interference ratio (Ecp/(Io+No)), collectively called (Ecp/Nt), given the current rate of transmission. Measurement of pilot Ecp/Nt from all fingers in multi-path scenario is disclosed in U.S. application Ser. No. 10/011,519 entitled "METHOD AND APPARATUS FOR DETERMINING REVERSE LINK LOAD LEVEL FOR REVERSE LINK DATA RATE SCHEDULING IN A CDMA COMMUNICATION SYSTEM," filed Nov. 5, 2001, and assigned to the assignee of the present invention.

From the measurement of pilot Ecp/Nt at current rates on different channels, capacity contribution of a mobile is estimated at new rates on these channels.

In an embodiment, mobile requests for rate allocation are prioritized. A list of all mobiles that a scheduler is responsible for scheduling is maintained depending on which level the scheduling is performed. In an embodiment, there is one list for all the mobiles. Alternatively, there are two lists for all mobiles. If the scheduler is responsible for scheduling all the base stations a mobile has in its Active Set, then the mobile belongs to a First List. A separate Second List may be maintained for those mobiles that have a base station in the Active Set that the scheduler is not responsible for scheduling. Prioritization of mobile rate requests is based on various reported, measured or known parameters that maximize system throughput, while allowing for mobile fairness as well as their importance status.

In an embodiment, Greedy Filling is used. In Greedy Filling, a highest priority mobile obtains the available sector capacity. A highest rate that can be allocated to the mobile is determined as the highest rate that the mobile can transmit at. In an embodiment, the highest rates are determined based on measured SNR. In an embodiment, the highest rates are determined based on Ecp/Nt. In an embodiment, the highest rates are determined based also on limiting parameters. In an embodiment, the highest rate is determined by a mobile's buffer estimate. The choice of a high rate decreases the transmission delays and decreases interference that the transmitting mobile observes. Remaining sector capacity can be allocated to the next lower priority mobile. This methodology helps in maximizing the gains due to interference reduction while maximizing the capacity utilization.

By the choice of different prioritization functions, the Greedy Filling algorithm can be tuned to the conventional round-robin, proportionally fair or most unfair scheduling based on a specified cost metric. Under the class of scheduling considered, the above method helps aid maximum capacity utilization.

The mobile station initiates a call by transmitting a request message to the base station. Once the mobile receives a channel assignment message from base station, it can use logical dedicated channel for further communication with the basestation. In a scheduled system, when the mobile station has data to transmit, it can initiate the high-speed data transmission on the reverse link by transmitting a request message on the reverse link.

Rate request and rate allocation structure currently specified in IS 2000 Release C is considered. However, it would be apparent to those skilled in the art that the scope of the design is not limited to IS 2000. It would be apparent to those skilled in the art, that embodiments may be implemented in any multiple access system with a centralized scheduler for rate allocation.

Mobile Station Procedures

In an embodiment, mobile stations (MS) at least support the simultaneous operation of the following channels:
1. Reverse Fundamental Channel (R-FCH)
2. Reverse Supplemental Channel (R-SCH)

Reverse Fundamental Channel (R-FCH): When a voice-only MS has an active voice-call, it is carried on the R-FCH. For data-only MS, R-FCH carries signaling and data. Exemplary R-FCH channel frame size, coding, modulation and interleaving are specified in TIA/EIA-IS-2000.2, "Mobile Station-Base Station Compatibility Standard for Dual-Mode Wideband Spread Spectrum Cellular System," June, 2002.

In an exemplary embodiment, R-FCH at a null rate is used for outer-loop power control (PC), when an MS is not transmitting voice, data or signaling on R-FCH. Null rate means a lowest rate. R-FCH at a lowest rate may be used to maintain outer-loop power control even when there is no transmission on R-SCH.

Reverse Supplemental Channel (R-SCH): The MS supports one R-SCH for packet data transmissions in accordance with an embodiment. In an exemplary embodiment, the R-SCH uses rates specified by radio configuration (RC3) in TIA/EIA-IS-2000.2.

In an embodiment where only single data channel (R-SCH) is supported, the signaling and power control can be done on a control channel. Alternatively, signaling can be carried over R-SCH and outer-loop PC can be carried on R-SCH whenever it is present.

In an embodiment, the following procedures are followed by mobile stations:
- Multiple Channel Adjustment Gain
- Discontinuous Transmission and Variable Supplemental Adjustment Gain
- Overhead transmission of R-CQICH and other control channels
- Closed-loop Power Control (PC) command
- Rate request using a Supplemental Channel Request Mini Message (SCRMM) on a 5-ms R-FCH or a Supplemental Channel Request Message (SCRM) on a 20-ms R-FCH Multiple Channel Adjustment Gain: When the R-FCH and the R-SCH are simultaneously active, multiple channel gain table adjustment as specified in TIA/EIA-IS-2000.2 is performed to maintain correct transmission power of the R-FCH. The traffic-to-pilot (T/P) ratios for all channel rate are also specified in the Nominal Attribute Gain table in appendix A as Nominal Attribute Gain values. Traffic-to-pilot ratio means the ratio of traffic channel power to pilot channel power.

Discontinuous Transmission and Variable Supplemental Adjustment Gain: The MS may be assigned an R-SCH rate by a scheduler during each scheduling period. When the MS is not assigned an R-SCH rate, it will not transmit anything on the R-SCH. If the MS is assigned to transmit on the R-SCH, but it does not have any data or sufficient power to transmit at the assigned rate, it disables transmission (DTX) on the R-SCH. If the system allows it, the MS may be transmitting on the R-SCH at a rate lower than the assigned one autonomously. In an embodiment, this variable-rate R-SCH operation is accompanied by the variable rate SCH gain adjustment as specified in TIA/EIA-IS-2000.2. R-FCH T/P is adjusted assuming the received pilot SNR is high enough to support the assigned rate on R-SCH.

Overhead transmission of R-CQICH and other control channels: A data-only MS transmits extra power on CQICH and/or other control channels at a CQICH-to-pilot (or control-to-pilot) (C/P) ratio with multi-channel gain adjustment performed to maintain correct transmission power of the R-CQICH (or control channels). (C/P) value may be different for MS in soft-handoff from those not in soft handoff. (C/P) represent the ratio of total power used by the control channels to the pilot power without multichannel gain adjustment.

Closed-loop Power Control (PC) command: In an embodiment, an MS receives one PC command per power control group (PCG) at a rate of 800 Hz from all base stations (BSs) in the MS's Active Set. A PCG is a 1.25 ms interval on the Reverse Traffic Channel and the Reverse Pilot Channel. Pilot power is updated by +−1 dB based on an "Or-of-Downs" rule, after combining of the PC commands from co-located BSs (sectors in a given cell).

Rate request is done with one of two methods. In a first method, rate request is performed using a Supplemental Channel Request Mini Message (SCRMM) on a 5-ms R-FCH as specified in TIA/EIA-IS-2000.5.

Supplemental Channel Request Mini Message (SCRMM) on a 5-ms R-FCH: In an embodiment, each SCRMM transmission is 24 bits (or 48 bits with the physical layer frame overhead in each 5-ms FCH frame at 9.6 kbps).

The MS sends the SCRMM in any periodic interval of 5 ms. If a 5-ms SCRMM needs to be transmitted, the MS interrupts its transmission of the current 20-ms R-FCH frame, and instead sends a 5-ms frame on the R-FCH. After the 5-ms frame is sent, any remaining time in the 20-ms period on the R-FCH is not transmitted. The discontinued transmission of the 20-ms R-FCH is re-established at the start of next 20-ms frame.

In a second method, rate request is performed using a Supplemental Channel Request Message (SCRM) on a 20-ms R-FCH.

Depending on different embodiments, different information can be sent on a request message. In IS2000, Supplemental Channel Request Mini Message (SCRMM) or a Supplemental Channel Request Message (SCRM) is sent on the reverse-link for rate request.

In an embodiment, the following information shall be reported by the MS to the BS on each SCRM/SCRMM transmission:

Maximum Requested Rate

Queue Information

Maximum Requested Rate: It can be the maximum data rate an MS is capable of transmitting at the current channel conditions leaving headroom for fast channel variations. An MS may determine its maximum rate using the following equation:

$$R_{max}(power) = \underset{R}{\operatorname{argmax}} \left\{ \begin{array}{c} R: Pref(R) * NormAvPiTx(PCG_i) * \\ \left(1 + \left(\frac{T}{P}\right)_R + \left(\left(\frac{T}{P}\right)_{9.6k} + \frac{C}{P}\right)\left(\frac{Pref(9.6)}{Pref(R)}\right)\right) \geq \\ \frac{Tx(max)}{Headroom\_Req} \end{array} \right\}$$

$NormAvPiTx(PCG_i) =$ $$\alpha_{Headroom} \frac{TxPiPwr(PCG_i)}{Pref(Rassigned)} + (1 - \alpha_{Headroom}) \times NormAvPiTx(PCG_{i-1}),$$

where Pref(R) is the "Pilot Reference Level" value specified in the Attribute Gain Table in TIA/EIA-IS-2000.2, TxPiPwr($PCG_i$) is the actual transmit pilot power after power constraints on the MS side are applied in case of power outage, and NormAvPiTx($PCG_i$) is the normalized average transmit pilot power. An MS may be more conservative or aggressive in its choice of headroom and determination of maximum requested rate depending on what is permitted by the BS.

In an embodiment, the MS receives grant information by one of the two following methods:

Method a: Enhanced supplemental channel assignment mini message (ESCAMM) from BS on 5-ms forward dedicated control channel (F-DCCH) with rate assignment for specified scheduling duration.

Method b: Enhanced supplemental channel assignment message (ESCAM) from BS on forward physical data channel (F-PDCH) with rate assignment for specified scheduling duration.

The assignment delays depend on the backhaul and transmission delays and are different depending on which method is used for rate grant. During the scheduled duration, the following procedures are performed:

In an embodiment where R-FCH is used to transmit autonomous data and for outer-loop PC, the MS transmits data at an autonomous rate of 9600 bps if it has some data in its buffer. Otherwise, the MS sends a null R-FCH frame at a rate of 1500 bps.

The MS transmits at the assigned R-SCH rate in a given 20-ms period if the MS has more data than can be carried on the R-FCH and if the MS has decided that it would have sufficient power to transmit at the assigned rate (keeping headroom for channel variations). Otherwise, there is no transmission on the R-SCH during the frame or the MS transmits at a lower rate which satisfies the power constraint. The MS decides that it has sufficient power to transmit on the R-SCH at the assigned rate R in a given 20-ms period Encode_Delay before the beginning of that 20-ms period if the following equation is satisfied:

$$Pref(R) * NormAvPiTx(PCG_i)\left[1 + (T/P)_R + \left((T/P)_{R_{FCH}} + (C/P)\right)\left(\frac{Pref(R_{FCH})}{Pref(R)}\right)\right] < \frac{Tx(max)}{Headroom\_Tx}$$

where Pref(R) is the "Pilot Reference Level" value specified in the Attribute Gain Table in TIA/EIA-IS-2000.2, NormAvPiTx($PCG_i$) is the normalized average transmit pilot power, $(T/P)_R$ is the traffic to pilot ratio that corresponds to rate R and for all channel rates is specified in the Nominal Attribute Gain table in appendix A as Nominal Attribute Gain values, $(T/P)_{R_{FCH}}$ is the traffic to pilot ratio on FCH, (C/P) is the ratio of total power used by the control channels to the pilot power without multichannel gain adjustment, $T_x(max)$ is the maximum MS transmit power, and Headroom_Tx is the headroom the MS keeps to allow for channel variation.

The DTX determination is done once every frame, Encode_Delay PCGs before the R-SCH transmission. If the MS disables transmission on the R-SCH, it transmits at the following power:

$$TxPwr(PCG_i) = PiTxPwr(PCG_i)\left[1 + \left((T/P)_{R_{FCH}} + (C/P)\right)\left(\frac{Pref(R_{FCH})}{Pref(R)}\right)\right]$$

An MS encodes the transmission frame Encode_Delay before the actual transmission.

Base Station Procedures

In an embodiment, the BS performs the following essential functions:

Decoding of R-FCH/R-SCH

Power control

Decoding of R-FCH/R-SCH

When there are multiple traffic channels transmitted by the MS simultaneously, each of the traffic channels is decoded after correlating with the corresponding Walsh sequence.

Power-Control

Power control in a CDMA system is essential to maintain the desired quality of service (QoS). In IS-2000, the RL pilot channel (R-PICH) of each MS is closed-loop power controlled to a desired threshold. At the BS, this threshold, called power control set point, is compared against the received Ecp/Nt to generate power control command (closed-loop PC), where Ecp is the pilot channel energy per chip. To achieve the desired QoS on the traffic channel, the threshold at the BS is changed with erasures on the traffic channel, and has to be adjusted when the data rate changes.

Set point corrections occur due to:

Outer-loop power control

Rate Transitions

Outer-loop power control: If the R-FCH is present, the power control set point is corrected based on erasures of the R-FCH. If R-FCH is not present, the outer-loop PC is corrected based on erasures of some control channel or R-SCH when the MS is transmitting data.

Rate Transitions: Different data rates on the R-SCH require different optimal set point of the reverse pilot channel. When data rate changes on the R-SCH, the BS changes the MS's received Ecp/Nt by the Pilot Reference Levels (Pref(R)) difference between the current and the next R-SCH data rate. In an embodiment, the Pilot Reference Level for a given data rate R, Pref(R), is specified in the Nominal Attribute Gain Table in C.S0002-C. Since the closed-loop power control brings the received pilot Ecp/Nt to the set point, the BS adjusts the outer loop set point according to the next assigned R-SCH data rate:

$$\Delta = Pref(Rnew) - Pref(Rold)$$

Set point adjustment is done $\lceil \Delta \rceil$ PCGs in advance of the new R-SCH data rate if $R_{new} > R_{old}$. Otherwise, this adjustment occurs at the R-SCH frame boundary. The pilot power thus ramps up or down to the correct level approximately in 1 dB step sizes of the closed loop as shown in FIG. 2.

Figure 2:
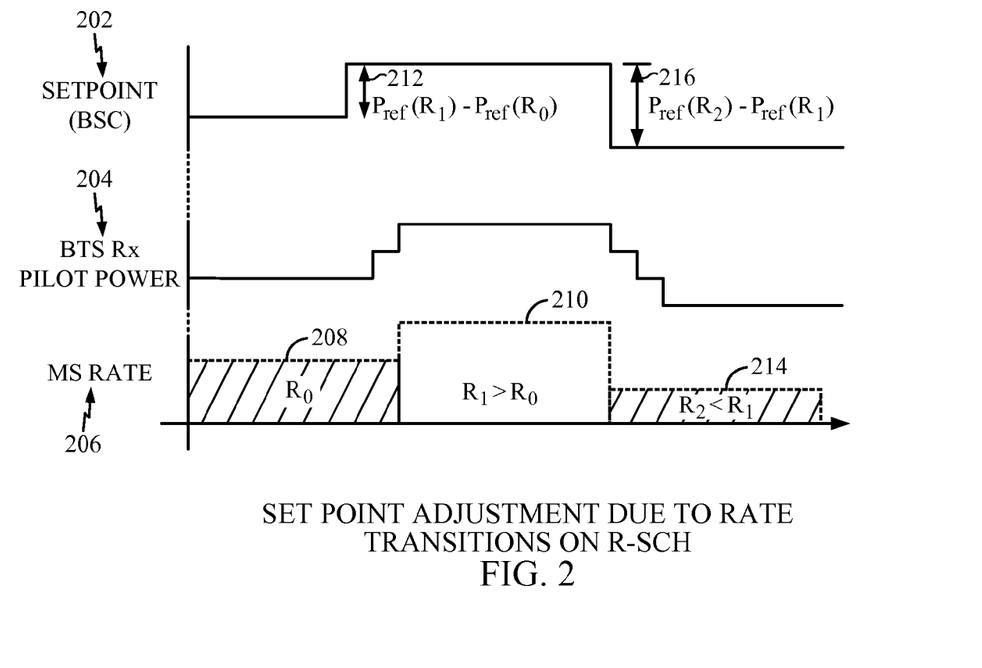
FIG. 2 shows set point adjustment due to rate transitions on R-SCH in accordance with an embodiment.

FIG. 2 shows set point adjustment due to rate transitions on R-SCH in accordance with an embodiment. The vertical axis of FIG. 2 shows a setpoint of a base station controller (BSC) 202, a base transceiver subsystem (BTS) receiver pilot power 204, and the mobile station rate 206. The MS rate is initially at $R_0$ 208. When the R-SCH data rate increases, i.e., R1>R0 210, then the setpoint is adjusted according to $P_{ref}(R_1)-P_{ref}(R_0)$ 212. When the R-SCH data rate decreases, i.e., R2<R1 214, then the setpoint is adjusted according to $P_{ref}(R_2)-P_{ref}(R_1)$ 216.

Scheduler Procedures

A scheduler may be collocated with the BSC, or BTS or at some element in the network layer. A Scheduler may be multilevel with each part responsible for scheduling those MSs that share the lower layer resources. For example, the MS not in soft-handoff (SHO) may be scheduled by BTS while the MS in SHO may be scheduled by part of the scheduler collocated with BSC. The reverse-link capacity is distributed between BTS and BSC for the purpose of scheduling.

In an embodiment, the following assumptions are used for the scheduler and various parameters associated with scheduling in accordance with an embodiment:

1. Centralized Scheduling: The scheduler is co-located with the BSC, and is responsible for simultaneous scheduling of MSs across multiple cells.

2. Synchronous Scheduling: All R-SCH data rate transmissions are time aligned. All data rate assignments are for the duration of one scheduling period, which is time aligned for all the MSs in the system. The scheduling duration period is denoted SCH_PRD.

3. Voice and Autonomous R-SCH transmissions: Before allocating capacity to transmissions on R-SCH through rate assignments, the scheduler looks at the pending rate requests from the MSs and discounts for voice and autonomous transmissions in a given cell.

4. Rate Request Delay: The uplink request delay associated with rate requesting via SCRM/SCRMM is denoted as D_RL (request). It is the delay from the time the request is sent to when it is available to the scheduler. D_RL(request) includes delay segments for over-the-air transmission of the request, decode time of the request at the cells, and backhaul delay from the cells to the BSC, and is modeled as a uniformly distributed random variable.

5. Rate Assignment Delay: The downlink assignment delay associated with rate assignment via ESCAM/ESCAMM is denoted as D_FL(assign). It is the time between the moment the rate decision is made and the time the MS receiving the resultant assignment. D_FL(assign) includes backhaul delay from the scheduler to the cells, over-the-air transmission time of the assignment (based on method chosen), and its decode time at the MS.

6. Available Ecp/Nt Measurement: The Ecp/Nt measurement used in the scheduler shall be the latest available to it at the last frame boundary. The measured Ecp/Nt is reported to the scheduler by the BTS receiver periodically and so it is delayed for a BSC receiver.

Figure 3:
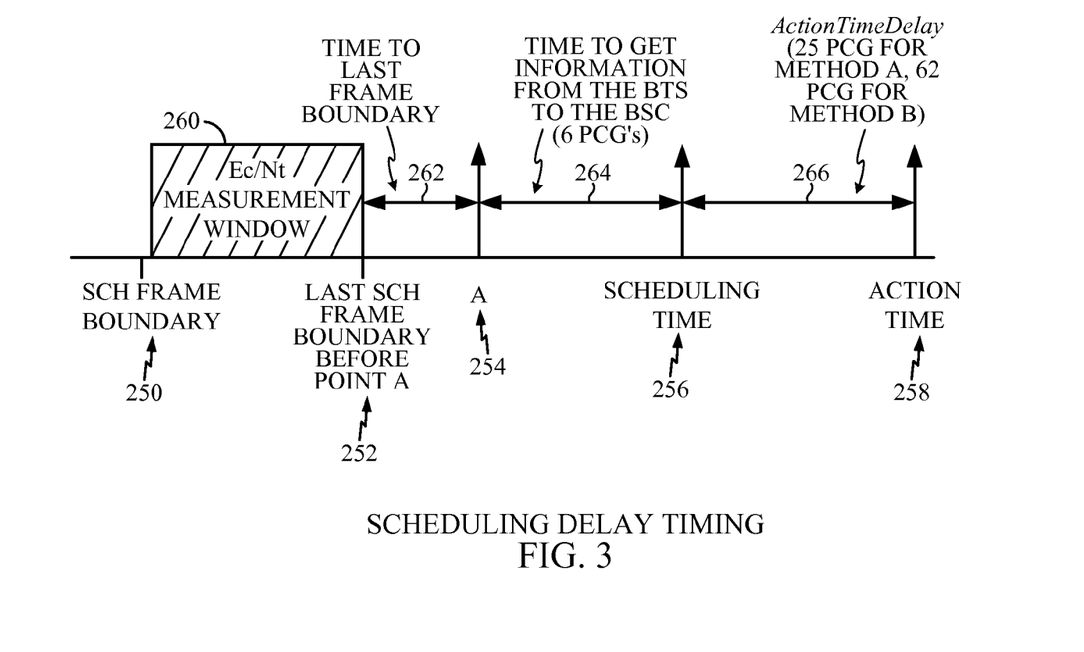
FIG. 3 shows scheduling delay timing in accordance with an embodiment.

FIG. 3 shows scheduling delay timing in accordance with an embodiment. The numbers shown are an example of typical numbers that may be used by a BSC located scheduler though the actual numbers are dependent on backhaul delays and loading scenario of the deployed system.

The horizontal axis shows an SCH frame boundary 250, a last SCH frame boundary before a point A 252, a point A 254, a scheduling time 256, and an action time 258. An Ec/Nt measurement window 260 is shown starting at the SCH frame boundary 250 and ending at the last SCH frame boundary before point A 252. A time to last frame boundary 262 is shown from the last SCH frame boundary before point A 252 to point A 254. A time to get information from the BTS to the BSC (6 PCGs) 264 is shown starting at point A 254 and ending at the scheduling time 256. ActionTimeDelay (25 PCGs for Method a, 62 PCGs for Method b) 266 is shown to start at the scheduling time 256 and ending at the action time 258.

Scheduling, Rate Assignment and Transmission Timeline

Given the assumed synchronous scheduling, most events related to request, grant and transmission are periodic with period SCH_PRD.

Figure 4:
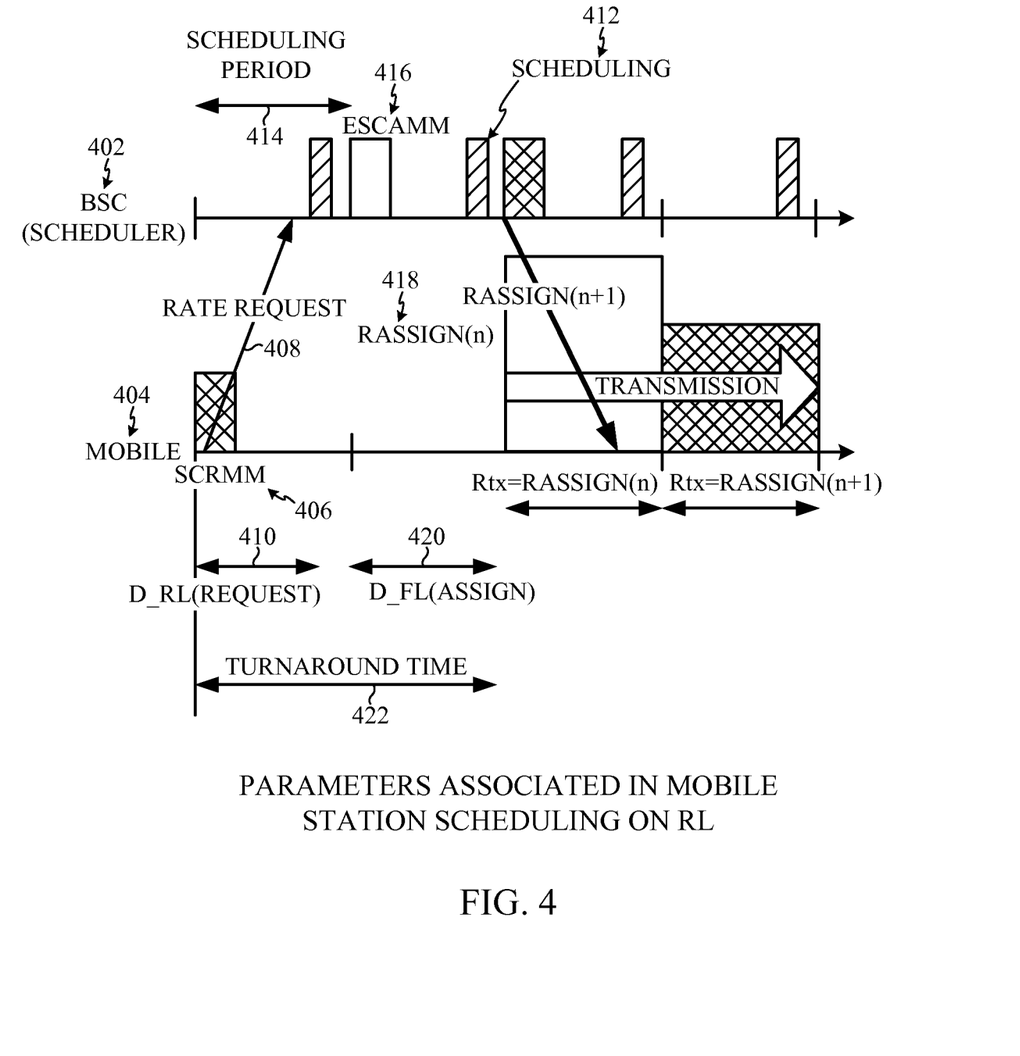
FIG. 4 shows parameters associated in mobile station scheduling on a reverse link.

FIG. 4 illustrates the timing diagram of a rate request, scheduling and rate allocation in accordance with an embodiment. The vertical axes show the time lines for the BSC (scheduler) 402 and the mobile 404. The MS creates an SCRMM 406 and sends a rate request to the BSC (scheduler) 408. The rate request is included in the SCRMM, which is sent on R-FCH. The uplink request delay associated with rate requesting via SCRM/SCRMM is denoted as D_RL(request)

410. A scheduling decision 412 is made once every scheduling period 414. After the scheduling decision 412, an ESCAM/ESCAMM 416 is sent on a forward channel from the BSC to the MS indicating a rate assignment 418. D_FL 420 is the downlink assignment delay associated with rate assignment via ESCAM/ESCAMM. Turnaround time 422 is the time it takes to turnaround a rate request. It is the time from the rate request to rate assignment.

The following characterizes the timeline:
Scheduling Timing
Scheduled Rate Transmissions
MS R-SCH Rate Requests Scheduling Timing: The scheduler operates once every scheduling period. If the first scheduling decision is performed at $t_i$, then the scheduler operates at $t_i$, $t_i$+SCH_PRD, $t_i$+2SCH_PRD...

Scheduled Rate Transmissions: Given that the MSs have to be notified of the scheduling decisions with sufficient lead-time, a scheduling decision has to be reached at Action Time of the ESCAM/ESCAMM message minus a fixed delay, ActionTimeDelay. Typical values of ActionTimeDelay for Methods a and b are given in Table 1.

MS R-SCH Rate Requests: R-SCH rate requests are triggered as described below:

Before the beginning of each SCRM/SCRMM frame encode boundary, the MS checks if either of the following three conditions are satisfied:

1. New data arrives and data in the MS's buffer exceeds a certain buffer depth (BUF_DEPTH), and the MS has sufficient power to transmit at a non-zero rate; OR 2. If the last SCRM/SCRMM was sent at time $\tau_i$, and the current time is greater than or equal to $\tau_i$+SCH_PRD, and if the MS has data in its buffer that exceeds the BUF_DEPTH, and the MS has sufficient power to transmit at a non-zero rate; OR 3. If the last SCRM/SCRMM was sent at time $\tau_i$, and the current time is greater than or equal to $\tau_i$+SCH_PRD, and if the current assigned rate at the MS side based on received ESCAMM/ESCAM is non-zero (irrespective of the fact that the MS may not have data or power to request a non-zero rate). "Current assigned rate" is the assigned rate applicable for the current rate transmission. If no ESCAM is received for the current scheduled duration, then the assigned rate is considered 0. The rate assigned in the ESCAM/ESCAMM message with Action Time at some later time takes effect after the Action Time.

If either of the above three conditions are satisfied, the MS sends a SCRMM/SCRM rate request.

In an embodiment, an SCRM/SCRMM request made at $\tau_i$ is made available to the scheduler after a random delay at $\tau_i$+D_RL(request). In another embodiment, different combinations of change in MS data buffer, change in MS maximum supportable rate and MS last request time out may be used to determine the time when a rate request is sent.

Scheduler Description and Procedures

In an embodiment, there is one centralized scheduler element for a large number of cells. The scheduler maintains a list of all MSs in the system and BSs in each MS's Active Set. Associated with each MS, the scheduler stores an estimate of an MS's queue size ($\hat{Q}$) and maximum scheduled rate (Rmax(s)).

The queue size estimate $\hat{Q}$ is updated after any of the following events happen:

1. An SCRMM/SCRM is received: SCRMM/SCRM is received after a delay of D_RL(request). $\hat{Q}$ is updated to:

$$\hat{Q} = \text{Queue Size reported in SCRMM}$$

If the SCRMM/SCRM is lost, the scheduler uses the previous (and the latest) information it has.

2. After each R-FCH and R-SCH frame decoding:

$$\hat{Q} = \hat{Q} - \text{Data}_{tx}(\text{FCH}) + \text{Data}_{tx}(\text{SCH})$$

where $\text{Data}_{tx}(\text{FCH})$ and $\text{Data}_{tx}(\text{SCH})$ is the data transmitted in the last R-FCH and R-SCH frame, respectively (if the frame is decoded correctly) after discounting the physical layer overhead and RLP layer overhead.

3. At the scheduling instant $t_i$, scheduler estimates the maximum scheduled rate for the MS in accordance with an embodiment. The buffer size estimation is done as:

$$\hat{Q}(f) = \hat{Q} - (R_{assigned} + 9600) \times \lceil \text{ActionTimeDelay}/20 \rceil \cdot 20 \text{ ms} + ((\text{PL\_FCH\_OHD} + \text{SCH}_{assigned} * \text{PL\_SCH\_OHD}) \times (\lceil \text{ActionTimeDelay}/20 \rceil))$$

The maximum scheduled rate is obtained as the minimum of the maximum power constrained rate and maximum buffer size constrained rate. Maximum power constrained rate is the maximum rate that can be achieved with MS available power, and maximum buffer size constrained rate is the maximum rate such that the transmitted data is smaller or equal to the estimated buffer size.

$$R_{max}(s) = \min \begin{cases} R_{max}(\text{power}), & \operatorname*{argmax}_{\substack{R \\ R \leq 307.2 kbps}} \left\{ R \mid \hat{Q}(f) \geq ((R + 9600) \times 20 \text{ ms} - \right. \\ \left. \text{PL\_FCH\_OHD} - \text{PL\_SCH\_OHD}) \times (\text{SCH\_PRD}/20 \text{ ms}) \right\} \end{cases}$$

where $\text{SCH}_{Assigned}$ is an indicator function for the current scheduling period, $$SCH_{Assigned} = \begin{cases} 1 & \text{if } R_{assigned} > 0 \\ 0 & \text{if } R_{assigned} = 0 \end{cases}$$

$R_{assigned}$ is the rate assigned on the R-SCH during the current scheduling period and MS is supposed to transmit on the R-SCH until the ActionTime of the next assignment. PL_FCH_OHD is physical layer fundamental channel overhead. PL_SCH_OHD is physical layer supplemental channel overhead.

$R_{max}(\text{power})$ is the maximum rate that the MS can support given its power limit. If the maximum requested rate by the MS is determined according to an embodiment described herein, $R_{max}(\text{power})$ is the maximum rate reported in the last received SCRM/SCRMM message. If the maximum rate is determined according to a different embodiment, the scheduler can estimate $R_{max}(\text{power})$ from the reported information and MS capability to transmit at the assigned rate. For example, in another embodiment, the scheduler can estimate $R_{max}(\text{power})$ according to the equation below:

$$R_{max}(\text{power}) = \begin{cases} \min \left\{ \begin{array}{l} R(\text{reported}), \\ R_{assigned} + 1 \end{array} \right\}; & \text{if } R_{tx} = R_{assigned} \\ \min \left\{ \begin{array}{l} R(\text{reported}), \\ R_{assigned} - 1 \end{array} \right\}; & \text{if } R_{tx} < R_{assigned} \end{cases}$$

$R_{assigned}$ is the rate assigned during current scheduling period and $R_{tx}$ is the rate transmitted on R-SCH during current scheduling period. $R_{assigned}+1$ is rate one higher than what is currently assigned to the MS and $R_{assigned}-1$ is a rate one lower than what is currently assigned to the MS. R(reported) is the maximum rate reported by the MS in rate request message like SCRM/SCRMM. The above method may be used when R(reported) by the MS is not related to the maximum rate that MS is capable of transmitting at its current power constraints.

Arg max provides the maximum supportable rate by the scheduler.

Capacity Computation

The sector capacity at the jth sector is estimated from the measured MSs' Sinrs. The Sinr is the average pilot-weighted combined Sinr per antenna. In an embodiment, the combining per power-control group (PCG) is pilot-weighted combining over multiple fingers and different antennas of the sector of interest. In an embodiment, the combining per power-control group (PCG) is maximal ratio combining over multiple fingers and different antennas. The combining is not over different sectors in the case of a softer-handoff MS. The averaging can be over the duration of a frame or it can be a filtered average over a couple of PCGs.

The following formula is used for estimating Load contribution to a sector antenna:

$$Load_j = \sum_{j \in ActiveSet(i)} \frac{Sinr_j(R_i, E[R_{FCH}])}{1 + Sinr_j(R_i, E[R_{FCH}])}$$

where $Sinr_j(R_i, E[R_{FCH}])$ is the estimated Sinr if the MS is assigned a rate $R_i$ on R-SCH and $E[R_{FCH}]$ is the expected rate of transmission on the R-FCH.

Let the measured pilot Sinr (frame average or filtered average pilot Sinr averaged over two antennas) be $(E_{cp}/N_t)_j$, while it is assigned a rate of Rassign(SCH) on the R-SCH. Then, $$Sinr_j(R_i, R_{FCH}) = \frac{Pref(R_i)}{Pref(R_{assign}(SCH))}(E_{cp}/N_t)_j \left[1 + (T/P)_{R_i} + ((T/P)_{R_{FCH}} + (C/P))\left(\frac{Pref(R_{FCH})}{Pref(R_i)}\right)\right]$$

C/P can be an average (CQICH/Pilot) or a (Control-to-pilot) ratio.

For voice-only MSs, the following equation is used to estimate the average received Sinr:

$$Sinr_j(0, E[R_{FCH}(v)]) = \frac{(E_{cp}/N_t)_j}{Pref(R_{assign}(SCH))} \times \left[1 + \begin{pmatrix} (T/P)_{9.6k}P(9.6k) + \\ (T/P)_{4.8k}P(4.8k) + \\ (T/P)_{2.7k}P(2.7k) + \\ ((T/P)_{1.5k}P(1.5k) + \\ (C/P) \end{pmatrix} \middle| Pref(R_{FCH}^{max} = 9.6k) \right]$$

where P(R) is the probability of voice codec transmitting at that rate. In another embodiment where a different voice codec with different rate selections are used, the same equation is used with different rates to estimate the expected Sinr due to voice transmission on R-FCH.

In a more generic formulation, with data-voice mobiles and no data transmission on R-FCH, the voice-activity factor (υ) could be used to estimate the average received Sinr as follows:

If the interference from neighboring sectors and average thermal noise can be measured, a more direct measure of the capacity of reverse-link called rise-over-thermal (ROT) can be obtained. Let the other-cell interference measured during previous transmission be denoted as $I_{oc}$, thermal noise be $N_o$, then the estimated ROT during the next transmission can be estimated as $$ROT_j = \frac{1}{(1 - Load_j)}(1 + I_{oc}/N_o).$$

If the scheduler is multi-level scheduler, with different levels of the scheduler elements scheduling different MSs, the sector capacity needs to be distributed across different scheduling elements. In an embodiment, where the scheduler has two scheduling elements, one at a BTS and the other at a BSC, let the estimated assigned Load at BSC be $Load_j(BSC)$ and the estimated assigned load at BTS be $Load_j(BTS)$. Then, $Load_j(BSC)+Load_j(BTS)<=1-(1+I_{oc}/N_o)/ROT(max).$ Since the timing delay in scheduling at BSC is greater than BTS, estimated assigned load at BSC $Load_j(BSC)$ can be known at BTS prior to scheduling at BTS. BTS scheduler prior to scheduling then has following constraint on the assigned load:

$Load_j(BTS)<=1-(1+I_{oc}/N_o)/ROT(max)-Load_j(BSC)$

Scheduling Algorithm

The scheduling algorithm has the following characteristics:

a) scheduling least number of MS for increasing TDM gains, b) CDM few users for maximum capacity utilization, and c) prioritization of MS rate requests.

Prioritization of mobiles can be based on one or more of the varied reported or measured quantities. A priority function that increases system throughput can have one or many of the following characteristics:

The higher the measured pilot Ecp/Nt (normalized), the lower is the mobile's priority. Instead of using a measured Ecp/Nt, a pilot Ecp/Nt set-point that the base-station maintains for power control outer-loop could be used. A lower Ecp/Nt (measured or set-point) implies a better instantaneous channel and hence increased throughput if channel variations are small.

For a mobile in SHO, pilot Ecp/Nt (measured or Set-point) can be weighted by an SHO factor to reduce the other-cell interference. For example, if average received pilot powers at all SHO legs is available, $$Sinr_j(R_i, E[R_{FCH}(v)]) = \frac{Pref(R_i)(E_{cp}/N_t)_j}{Pref(R_{assign}(SCH))}\left[1 + (T/P)_{R_i} + (v - 1 + v(T/P)_{R_{FCH}^{max}})\left(\frac{Pref(R_{FCH}^{max})}{Pref(R_i)}\right)\right]$$

$$\sum_{k=1}^{M} P_i^{rx}(k)/P_i^{rx}(j)$$

can serve as an SHO factor, where $P_i^{rx}(k)$ is the average received pilot power of the $i^{th}$ mobile by the $k^{th}$ base station in its Active Set, $P_i^{rx}(j)$ is the average received pilot power of the $i^{th}$ mobile by the strongest, $j^{th}$ base station in its Active Set, and M is the number of base stations in the mobile's Active Set (set of base stations in soft handoff with the mobile)

Higher the measured or estimated propagation loss, lesser is the priority. Propagation Loss can be calculated from the measured received pilot power if the mobile periodically reports transmitted pilot power in the request message like SCRM. Or otherwise, it can estimate which mobile sees better propagation loss based on the reported strength of the FL Ecp/Nt Velocity based priority function: If the base-station estimated velocity of a moving mobile using some velocity estimation algorithm, then stationary mobiles are given the highest priority, and middle velocity mobiles are given the least priority.

Priority function based on above measured or reported parameters is an unfair priority function aimed at increasing the reverse-link system throughput. In addition, priority can be increased or decreased by a cost metric that is decided by what grade of service a user is registered for. In addition to the above, a certain degree of fairness could be provided by a Fairness factor. Two different kinds of Fairness are described below:

Proportional Fairness (PF): PF is the ratio of maximum requested rate to average achieved transmission rate. Thus, $PF=R_i^{req}/R_i^{alloc}$, where $R_i^{req}$ is the requested rate and $R_i^{alloc}$ is the average rate allocated by the scheduler.

Round Robin Fairness (RRF): Round robin scheduling tries to provide equal transmission opportunities to all the users. When a mobile enters the system, RRF is initialized to some value, say 0. Each scheduling period the rate is not allocated to the mobile, RRF is incremented by one. Every time some rate (or the requested rate) is allocated to the mobile, RRF is reset to the initial value 0. This emulates the process where mobiles scheduled in the last scheduling period are last in the queue.

Fairness can be used together with Priority function to determine the priority of the mobile in the Prioritization list. When Fairness is used alone to prioritize mobiles, it provides proportional fair or round-robin scheduling that is throughput optimal for reverse-link as well as allowing multiple transmissions for full capacity utilization.

An embodiment which uses different aspects of previously defined priority functions and proportional fairness may have a priority of the $i^{th}$ user determined as:

$$w_i = \frac{1}{Ecp/Nt_i(setpt) * SHOfactor} \cdot (PF)^{\alpha},$$

where the parameter $\alpha$ called Fairness factor can be used to trade-off fairness for system throughput. As $\alpha$ increases, fairness gets worse. Schedulers with higher $\alpha$ yield higher throughput.

Next we consider a particular embodiment where the scheduler wakes up every scheduling period and makes rate allocation decisions based on pending rate requests. The scheduling algorithm looks like the one described below.

Initialization: The MS rate requests are prioritized. Associated with each MS is a priority count PRIORITY. PRIORITY of an MS is initialized to 0 in the beginning. When a new MS enters the system with sector j as the primary sector, its PRIORITY is set equal to the min{$PRIORITY_i$, $\forall i$ such that $MS_i$ has sector j as the primary sector}

1. Let the Load constraint be $Load_j \leq$ max Load, such that the rise-over-thermal overshoot above a certain threshold is limited. For the calibration purposes, max Load value of 0.45 will be used by the scheduler. The capacity consumed due to pilot transmissions and transmissions on fundamental channels (due to voice or data) is computed and the available capacity is computed as $$Cav(j) = \max Load - \sum_{j \in ActiveSet} \frac{Sinr_j(0, E[R_{FCH}])}{1 + Sinr_j(0, E[R_{FCH}])}$$

where max Load is the maximum Load for which rise-over-thermal outage criteria specified is satisfied.

MS rate requests are prioritized in decreasing order of their PRIORITY. So MSs with highest PRIORITY are at the top of the queue. When multiple MSs with identical PRIORITY values are at the top of the queue, the scheduler makes a equally-likely random choice among these MSs.

2. Set k=1,

3. The data-only MS at the kth position in the queue is assigned the rate $R_k$ given by $$R_k = \min\left\{R_{max}^k(s), \underset{R}{\operatorname{argmax}}\left[R \mid Cav(j) - \frac{Sinr_j(R, E[R_{FCH}])}{1 + Sinr_j(R, E[R_{FCH}])} + \frac{Sinr_j(0, E[R_{FCH}])}{1 + Sinr_j(0, E[R_{FCH}])} \geq 0; \forall j \in ActiveSet(k)\right]\right\}$$

The available capacity is updated to:

$$Cav(j) = Cav(j) - \frac{Sinr_j(R_k, E[R_{FCH}])}{1 + Sinr_j(R_k, E[R_{FCH}])} + \frac{Sinr_j(0, E[R_{FCH}])}{1 + Sinr_j(0, E[R_{FCH}])};$$

$$\forall j \in ActiveSet(k)$$

4. If $R_{max}^k(s) > 0$ and $R_k=0$, increment PRIORITY of the MS

Otherwise, do not change PRIORITY of the MS 5. k=k+1; if k<total number of MSs in the list, Go to Step 3, otherwise, stop.

TABLE 1

| Baseline specific parameters | | |
|---|---|---|
| Parameter | Typical Values | Comments |
| Headroom_Req | 5 dB | Conservative rate request<br>Keeps power headroom for long-term channel variation<br>Reduces DTX on R-SCH |
| Headroom_Tx | 2 dB | Reduces probability of power outage during the duration of R-SCH transmission |
| Average Tx Power Filter Coefficient $\square_{Headroom}$ | 1/16 | Normalized Average transmit pilot power is computed as filtered version over several PCGs |
| Action TimeDelay (Method a) | 31.25 ms | Based on the expected ESCAMM delay, including the 2 PCG MS encoding delay |
| Action TimeDelay (Method b) | 77.5 ms | Based on the expected ESCAM delay on F-PDCH at the primary sector Geometry of −5 dB. This includes the 2 PCG MS encoding delay |

It would be apparent to those skilled in the art that other values can be used for the parameters in table 1. It would also be apparent to those skilled in the art that more or less parameters may be used for a particular implementation.

Figure 5:
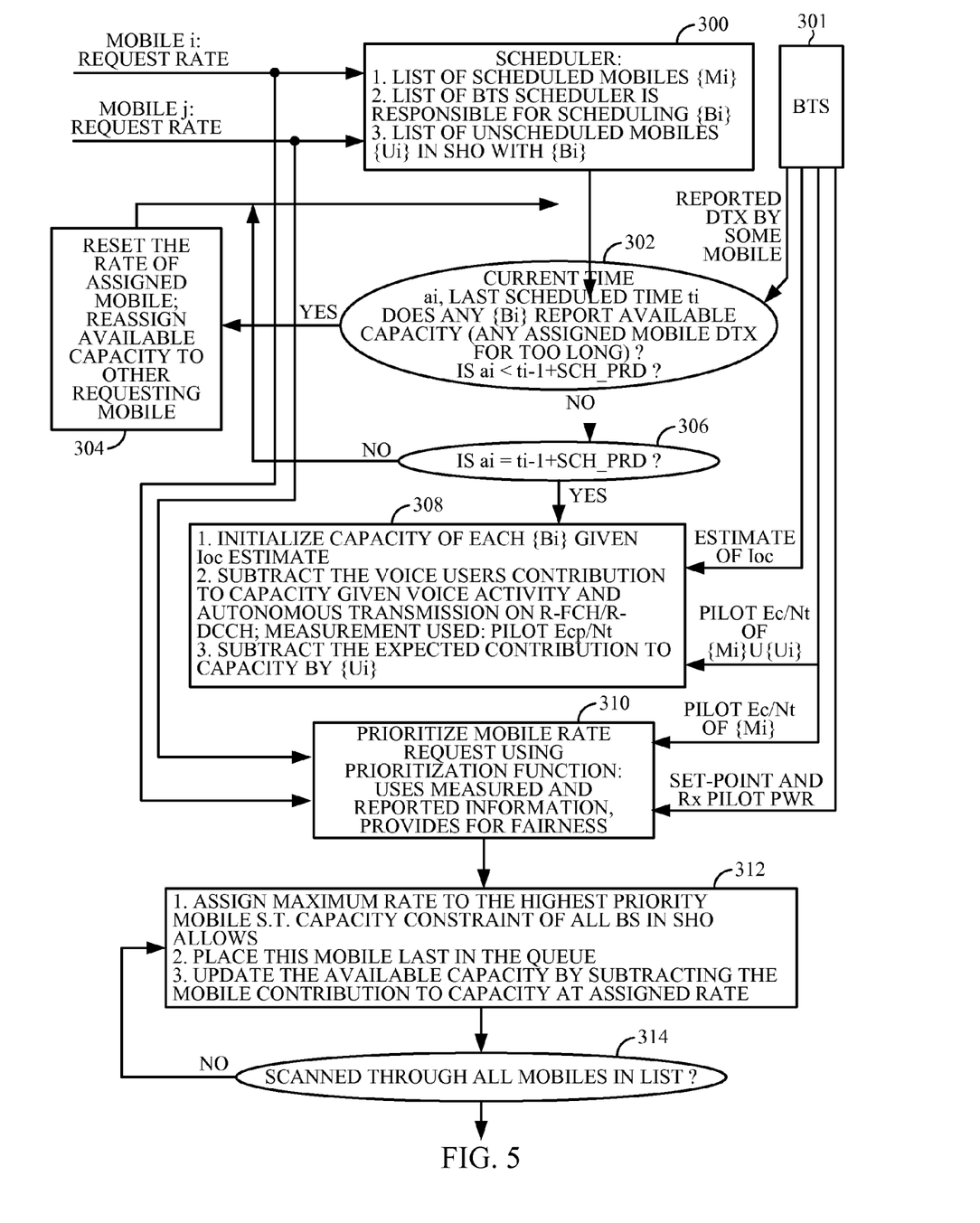
FIG. 5 is a flowchart of a scheduling process in accordance with an embodiment.

FIG. 5 is a flowchart of a scheduling process in an embodiment. In an embodiment, a mobile i and a mobile j send a request rate to a scheduler in step 300. Alternatively, a mobile i and a mobile j send a request rate to a scheduler in step 310.

In step 300, the scheduler creates a list of mobiles (Mi) that it will schedule. Then, the scheduler creates a list of base stations (BTSs) the scheduler is responsible for scheduling. Also, the scheduler creates a list of mobiles that are not in the list of base stations the scheduler is responsible for scheduling and that are in soft handoff (SHO) with base stations the scheduler is responsible for scheduling ($U_i$). The flow of control goes to step 302.

The BTS supplies the scheduler with a reported DTX by a mobile. In step 302, a check is made to determine whether a mobile, which is scheduled, reported a DTX, in which case resources can be reallocated from the scheduled mobile if $a_i$ is less than the last schedule time minus 1 plus a schedule period. ai is current time. $t_i$ is the last scheduled time. In step 302, the resources are reallocated before the scheduled time. The rate of the scheduled mobile is reset and the available capacity is reallocated to other requesting mobiles. In step 306, a check is made to determine whether the current time has reached a scheduled point. If the current time has not reached a scheduled point, then the flow of control goes to step 302. If the current time has reached a scheduled point, then the flow of control goes to step 308.

In step 308, the scheduler is supplied by the BTSs with an estimate of Ioc and pilot Ec/Nt of $\{M_i\}$ union $\{U_i\}$. The capacity of each Bi is initialized given the Ioc estimates. For each Bi, subtracting from the available capacity, the voice users contribution to capacity given voice activity and autonomous transmission on R-FCH/R-DCCH. The measurement used for the amount subtracted is the pilot Ecp/Nt. Also for each Bi, subtracted from the available capacity is the expected contribution by $\{Ui\}$. Then, the flow of control goes to step 310.

In step 310, pilot Ec/Nt of $\{M_i\}$ and set-point and Rx pilot power are provided to the scheduler and are used by a prioritization function. The mobile rate requests are prioritized in a prioritization queue. In an embodiment, a prioritization function is used in which measured and reported information is used. In an embodiment, a prioritization function provides for fairness. The flow of control goes to step 312.

In step 312, a maximum rate is assigned to a highest priority mobile such that a capacity constraint of all BSs in soft handoff is not violated. The maximum rate is the maximum rate supported by the highest priority mobile. The highest priority mobile is placed last in the prioritization queue. The available capacity is updated by subtracting the mobile contribution to capacity at an assigned maximum rate. The flow of control goes to step 314.

In step 314, a check is made to determine whether all the mobiles in the $\{Mi\}$ list have been scanned. If all the mobiles in the $\{Mi\}$ list have not been scanned, then the flow of control goes to step 312. If all the mobiles in the $\{Mi\}$ list have been scanned, then the flow of control goes to step 302.

Those of skill in the art would understand that method steps could be interchanged without departing from the scope of the invention. Those of skill in the art would also understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 6:
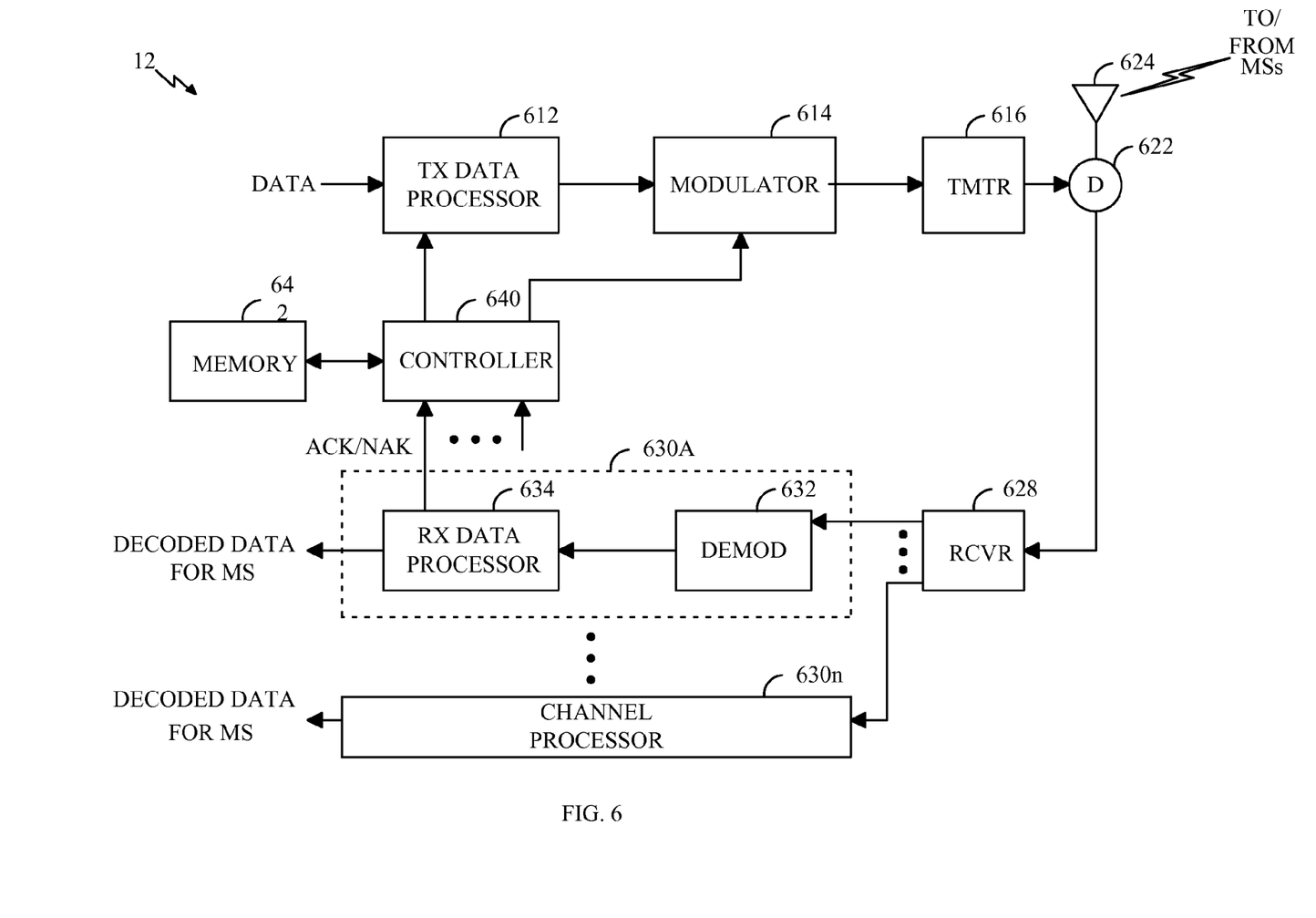
FIG. 6 is a block diagram of a base station in accordance with an embodiment.

FIG. 6 is a block diagram of a BS 12 in accordance with an embodiment. On the downlink, data for the downlink is received and processed (e.g., formatted, encoded, and so on) by a transmit (TX) data processor 612. The processing for each channel is determined by the set of parameters associated with that channel, and in an embodiment, may be performed as described by standard documents. The processed data is then provided to a modulator (MOD) 614 and further processed (e.g., channelized, scrambled, and so on) to provide modulated data. A transmitter (TMTR) unit 616 then converts the modulated data into one or more analog signals, which are further conditions (e.g., amplifies, filters, and frequency upconverts) to provide a downlink signal. The downlink signal is routed through a duplexer (D) 622 and transmitted via an antenna 624 to the designated MS(s).

Figure 7:
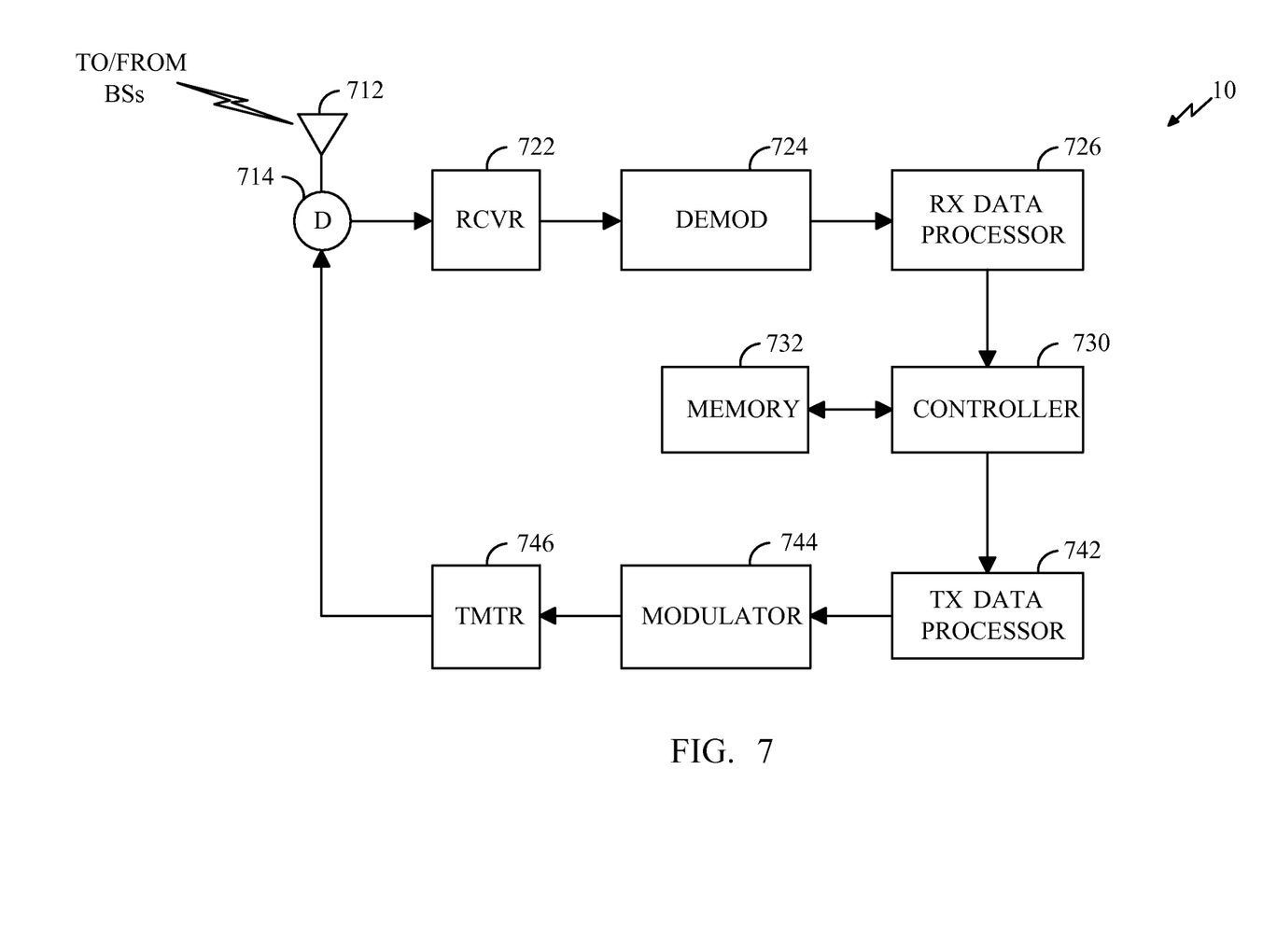
FIG. 7 is a block diagram of a mobile station in accordance with an embodiment.

FIG. 7 is a block diagram of an MS 106 in accordance with an embodiment. The downlink signal is received by an antenna 712, routed through a duplexer 714, and provided to a receiver (RCVR) unit 722. Receiver unit 722 conditions (e.g., filters, amplifies, and frequency downconverts) the received signal and further digitizes the conditioned signal to provide samples. A demodulator 724 then receives and processes (e.g., descrambles, channelizes, and data demodulates) the samples to provide symbols. Demodulator 724 may implement a rake receiver that can process multiple instances (or multipath components) of the received signal and provide combined symbols. A receive (RX) data processor 726 then decodes the symbols, checks the received packets, and provides the decoded packets. The processing by demodulator 724 and RX data processor 726 is complementary to the processing by modulator 614 and TX data processor 612, respectively.

On the uplink, data for the uplink, pilot data, and feedback information are processed (e.g., formatted, encoded, and so on) by a transmit (TX) data processor 742, further processed (e.g., channelized, scrambled, and so on) by a modulator (MOD) 744, and conditioned (e.g., converted to analog signals, amplified, filtered, and frequency upconverted) by a transmitter unit 746 to provide an uplink signal. The data processing for the uplink is described by standard documents. The uplink signal is routed through duplexer 714 and transmitted via antenna 712 to one or more BSs 12.

Referring back to FIG. 6, at BS 12, the uplink signal is received by antenna 624, routed through duplexer 622, and provided to a receiver unit 628. Receiver unit 628 conditions (e.g., frequency downconverts, filters, and amplifies) the received signal and further digitizes the conditioned signal to provide a stream of samples.

In the embodiment shown in FIG. 6, BS 12 includes a number of channel processors 630a through 630n. Each channel processor 630 may be assigned to process the sample steam for one MS to recover the data and feedback information transmitted on the uplink by the assigned MS. Each channel processor 630 includes a (1) demodulator 632 that processes (e.g., descrambles, channelizes, and so on) the samples to provide symbols, and (2) a RX data processor 634 that further processes the symbols to provide the decoded data for the assigned MS.

Controllers 640 and 730 control the processing at the BS and the MS, respectively. Each controller may also be designed to implement all or a portion of the scheduling process. Program codes and data required by controllers 640 and 730 may be stored in memory units 642 and 732, respectively.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

APPENDIX A

Reverse Link Nominal Attribute Gain Table

| Data Rate (bps) | Frame Length (ms) | Coding | Nominal_ Attribute_ Gain | Pilot_ Reference_ Level | Target Error Rate[1] |
|---|---|---|---|---|---|
| 1,200 | 80 | Convolutional | −56 | 0 | 0.05 |
| 1,350 | 40 | Convolutional | −54 | 0 | 0.05 |
| 1,500 | 20 | Convolutional | −47 | 0 | 0.01 |
| 1,800 | 20 | Convolutional | −42 | 3 | 0.01 |
| 1,800 | 40 or 80 | Convolutional | −45 | 3 | 0.05 |
| 2,400 | 40 or 80 | Convolutional | −30 | 0 | 0.05 |
| 2,700 | 20 | Convolutional | −22 | 0 | 0.01 |
| 3,600 | 20 | Convolutional | −13 | 3 | 0.01 |
| 3,600 | 40 or 80 | Convolutional | −17 | 3 | 0.05 |
| 4,800 | 20 | Convolutional | −2 | 0 | 0.01 |
| 4,800 | 40 or 80 | Convolutional | −3 | 0 | 0.05 |
| 7,200 | 20 | Convolutional | 15 | 3 | 0.01 |
| 7,200 | 40 or 80 | Convolutional | 10 | 3 | 0.05 |
| 9,600 | 20 | Convolutional | 30 | 0 | 0.01 |
| 9,600 | 40 or 80 | Convolutional | 24 | 0 | 0.05 |
| 9,600 (RC 3 and 5) | 5 | Convolutional | 58 | 0 | 0.01 |
| 9,600 (RC 4 and 6) | 5 | Convolutional | 54 | 3 | 0.01 |
| 14,400 | 20 | Convolutional | 44 | 3 | 0.01 |
| 14,400 | 40 or 80 | Convolutional | 40 | 3 | 0.05 |

APPENDIX A-continued

Reverse Link Nominal Attribute Gain Table

| Data Rate (bps) | Frame Length (ms) | Coding | Nominal_Attribute_Gain | Pilot_Reference_Level | Target Error Rate[1] |
|---|---|---|---|---|---|
| 19,200 | 20, 40, or 80 | Convolutional | 50 | 1 | 0.05 |
| 28,800 | 20, 40, or 80 | Convolutional | 56 | 11 | 0.05 |
| 38,400 | 20, 40, or 80 | Convolutional | 60 | 11 | 0.05 |
| 57,600 | 20, 40, or 80 | Convolutional | 72 | 18 | 0.05 |
| 76,800 | 20, 40, or 80 | Convolutional | 72 | 21 | 0.05 |
| 115,200 | 20, 40, or 80 | Convolutional | 80 | 32 | 0.05 |
| 153,600 | 20, 40, or 80 | Convolutional | 84 | 36 | 0.05 |
| 230,400 | 20 or 40 | Convolutional | 88 | 46 | 0.05 |
| 259,200 | 80 | Convolutional | 96 | 50 | 0.05 |
| 307,200 | 20 or 40 | Convolutional | 96 | 54 | 0.05 |
| 460,800 | 20 | Convolutional | 104 | 61 | 0.05 |
| 518,400 | 40 | Convolutional | 104 | 64 | 0.05 |
| 614,400 | 20 | Convolutional | 112 | 68 | 0.05 |
| 1,036,800 | 20 | Convolutional | 128 | 83 | 0.05 |
| 4,800 | 80 | Turbo | 2 | 0 | 0.05 |
| 7,200 | 80 | Turbo | 24 | 0 | 0.05 |
| 9,600 | 40 or 80 | Turbo | 34 | 0 | 0.05 |
| 14,400 | 40 or 80 | Turbo | 42 | 0 | 0.05 |
| 19,200 | 20, 40, or 80 | Turbo | 44 | 2 | 0.05 |
| 28,800 | 20, 40, or 80 | Turbo | 52 | 9 | 0.05 |
| 38,400 | 20, 40, or 80 | Turbo | 56 | 10 | 0.05 |
| 57,600 | 20, 40, or 80 | Turbo | 64 | 19 | 0.05 |
| 76,800 | 20, 40, or 80 | Turbo | 68 | 19 | 0.05 |
| 115,200 | 20, 40, or 80 | Turbo | 76 | 29 | 0.05 |
| 153,600 | 20, 40, or 80 | Turbo | 76 | 33 | 0.05 |
| 230,400 | 20 or 40 | Turbo | 88 | 39 | 0.05 |
| 259,200 | 80 | Turbo | 88 | 48 | 0.05 |
| 307,200 | 20 or 40 | Turbo | 88 | 50 | 0.05 |
| 460,800 | 20 | Turbo | 104 | 54 | 0.05 |
| 518,400 | 40 | Turbo | 108 | 56 | 0.05 |
| 614,400 | 20 | Turbo | 112 | 58 | 0.05 |
| 1,036,800 | 20 | Turbo | 125 | 78 | 0.05 |

[1]The error rate is the frame error rate when a single transmission unit is used; otherwise, the Logical Transmission Unit (LTU) error rate is used. This applies to the cases in which the Target Error Rate is 0.05.

What is claimed is:

1. A method of determining a maximum rate, comprising:
determining a normalized average pilot transmit power;
determining a transmit power for a mobile station based on the normalized average pilot transmit power, a pilot reference value, and a ratio of traffic power to pilot power for a rate;
determining a ratio of a maximum transmit power of the mobile station to a headroom for channel variation; and
determining a maximum value for the rate for which the transmit power of the mobile station is less than or equal to the ratio of the maximum transmit power of the mobile station to the headroom for channel variation.

2. The method of claim 1, wherein determining the normalized average pilot transmit power is based on an actual transmit pilot power after power constraints are applied.

3. The method of claim 2, wherein determining the normalized average pilot transmit power allows for headroom.

4. The method of claim 1, wherein determining the transmit power for the mobile station is further based on a ratio of control channel power to pilot power for the control channel.

5. A mobile station, comprising:
an antenna for receiving and transmitting a plurality of signals;
a receiver coupled to the antenna, the receiver receives the plurality of receive signals;
a controller coupled to the receiver, wherein the controller is configured to
determine a normalized average pilot transmit power from the plurality of receive signals,
determine a transmit power for the mobile station based on the normalized average pilot transmit power, a pilot reference value, and a ratio of traffic power to pilot power for a rate,
determine a ratio of a maximum transmit power of the mobile station to a headroom for channel variation, and
determine a maximum value of the rate for which the transmit power of the mobile station is less than or equal to the ratio of the maximum transmit power of the mobile station to the headroom for channel variation; and
a transmitter coupled to the controller, the transmitter conditions the maximum rate for transmission.

6. The mobile station of claim 5, wherein the determination of the normalized average pilot transmit power is based on an actual transmit pilot power after power constraints are applied.

7. The mobile station of claim 5, wherein the determination of the normalized average pilot transmit power allows for headroom.

8. The mobile station of claim 5, wherein the determination of the transmit power for the mobile station is further based on a ratio of control channel power to pilot power for the control channel.

9. A non-transitory computer-readable medium embodying a program of instructions executable by a processor to perform a method of determining a maximum rate, the method comprising:
determining a normalized average pilot transmit power;
determining a transmit power for a mobile station based on the normalized average pilot transmit power, a pilot reference value, and a ratio of traffic power to pilot power for a rate;
determining a ratio of a maximum transmit power of the mobile station to a headroom for channel variation; and
determining a maximum value for the rate for which the transmit power of the mobile station is less than or equal to the ratio of the maximum transmit power of the mobile station to the headroom for channel variation.

10. The non-transitory computer-readable medium of claim 9, wherein determining the normalized average pilot transmit power is based on an actual transmit pilot power after power constraints are applied.

11. The non-transitory computer-readable medium of claim 9, wherein determining the normalized average pilot transmit power allows for headroom.

12. The non-transitory computer-readable medium of claim 9, wherein determining the transmit power for the mobile station is further based on a ratio of control channel power to pilot power for the control channel.

* * * * *